United States Patent
Shyr

(10) Patent No.: US 6,570,766 B1
(45) Date of Patent: May 27, 2003

(54) COMPUTER CASING WITH REUSABLE SHIELDING PIECES

(75) Inventor: Daniel Shyr, Taipei (TW)

(73) Assignee: AVANCE Technologies Inc., Taipei (TW)

( * ) Notice: Subject to any disclaimer, the term of this patent is extended or adjusted under 35 U.S.C. 154(b) by 0 days.

(21) Appl. No.: 10/027,955

(22) Filed: Dec. 18, 2001

(30) Foreign Application Priority Data

Dec. 20, 2000 (TW) .................................... 089222114 U

(51) Int. Cl.⁷ ................................................ H05K 5/02
(52) U.S. Cl. ........................ 361/726; 361/801; 361/816; 360/98.01; 312/223.1; 439/157
(58) Field of Search ................................ 361/726, 724, 361/727–729, 801–802, 816, 818, 732, 740; 360/137, 97.01, 98.01; 364/78.1; 312/223.1–223.3, 332.1; 174/52.1; 206/701–702; 248/581, 609, 68.1; 439/157

(56) References Cited

U.S. PATENT DOCUMENTS 6,373,695 B1 * 4/2002 Cheng ........................ 361/685
6,388,873 B1 * 5/2002 Brooks et al. ............... 361/685
6,407,913 B1 * 6/2002 Peachey et al. ............. 361/685

* cited by examiner

Primary Examiner—Darren Schuberg
Assistant Examiner—Hung Van Duong

(57) ABSTRACT

A computer casing with reusable shielding pieces is disclosed. The computer casing has a plurality of expansion slots. Each expansion slot has an opening for mounting an information-accessing device. Each expansion slot has a shielding piece for covering the opening of the expansion slot. The size of each shielding piece is corresponding to the tracks so that the shielding piece is slidable along the tracks. Each shielding piece is formed with an engaging structure for being engaged with one side of the information-accessing device. Thereby, two opposite sides of the information-accessing device are engaged with the shielding pieces so that the information-accessing device is slidable along the tracks on the computer casing. As a consequent, the shielding pieces can be reused as an engaging structure for engaging an information-accessing device to a computer casing and no frame is required in the computer casing.

7 Claims, 4 Drawing Sheets

COMPUTER CASING WITH REUSABLE SHIELDING PIECES

FIELD OF THE INVENTION

The present invention relates to computer casings, and particularly to a computer casing with reusable shielding pieces.

BACKGROUND OF THE INVENTION

In general, the computer casings have frames for mounting and fixing information-accessing devices. In general, computer casings are formed with expansion slots for installing information-accessing devices and a plurality of shielding pieces are installed on the openings of the expansion slots for shielding the openings. When installing information-accessing devices, the detached shielding pieces are deserted.

However, this is not economical since the shielding pieces can not be reused, and moreover, a frame is necessary for mounting an information-accessing device.

SUMMARY OF THE INVENTION

Accordingly, the primary object of the present invention is to provide a computer casing with reusable shielding pieces, wherein shielding pieces can be reused as an engaging structure for engaging an information-accessing device to a computer casing and no frame is installed in the computer casing so as to save cost in the manufacturing of a computer casing.

To achieve above objects, the present invention provides a computer casing with reusable shielding pieces. The computer casing has a plurality of expansion slots. Each expansion slot has an opening for mounting an information-accessing device. Each expansion slot has a shielding piece for covering the opening of the expansion slot. The size of each shielding piece is corresponding to tracks on the walls of the computer casing so that the shielding piece is slidable along the tracks. Each shielding piece is formed with an engaging structure for being engaged to one side of the information-accessing device. Thereby, two opposite sides of the information-accessing device are engaged with the shielding pieces so that the information-accessing device is slidable along the tracks in the computer casing.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

In the present invention, tracks are installed at two wall plates 12, 13 of the expansion slots 11 of a computer casing 1 for mounting peripheral devices (for example, an information-accessing device). In the present invention, a plurality of triangular projections 121, 131 protrudes from the wall plates 12, 13. Two projections are formed as a set, and a plurality of projections are disposed linearly.

Figure 1:
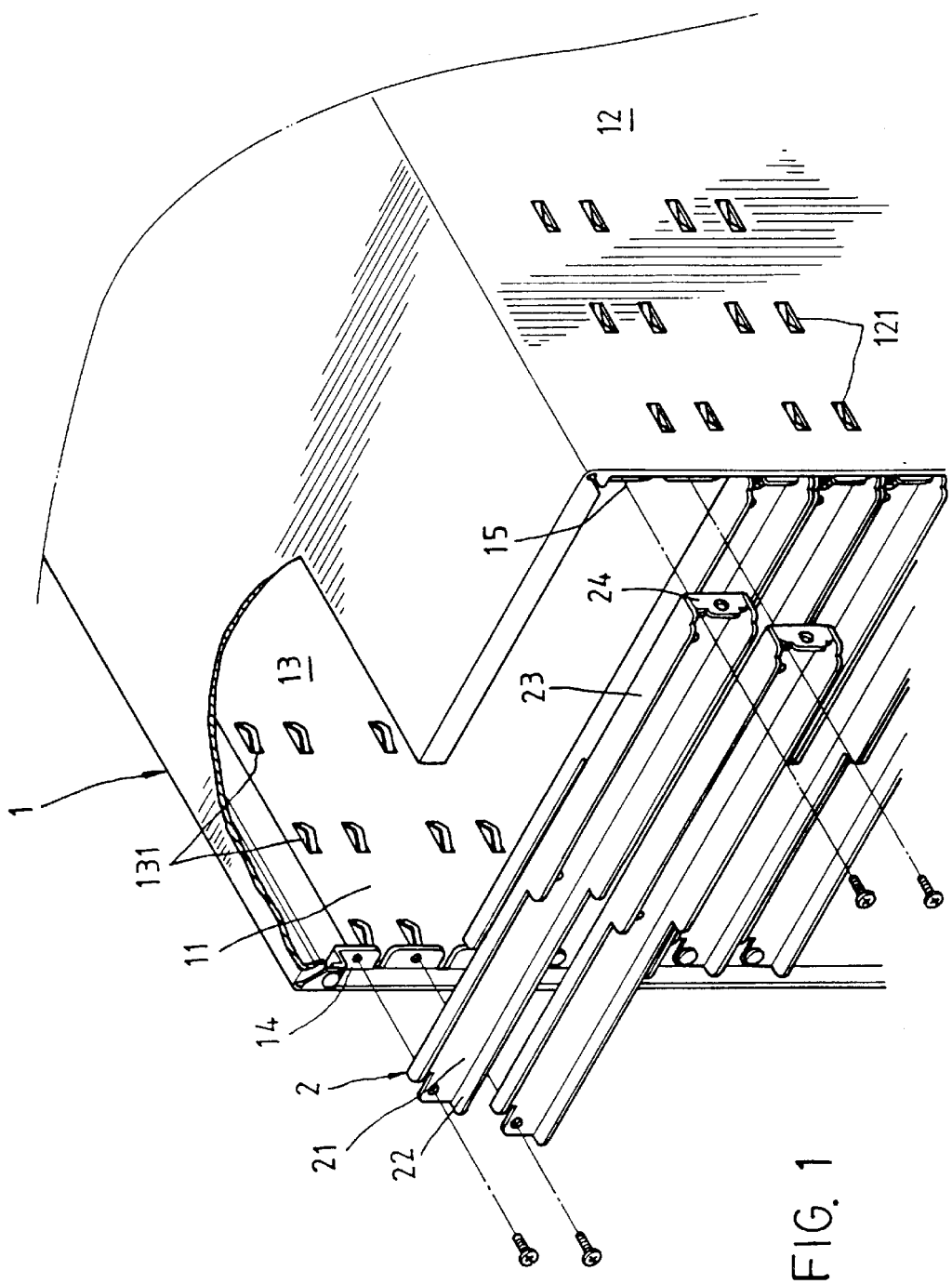
FIG. 1 shows an exploded view of the computer casing of the present invention.
Figure 2:
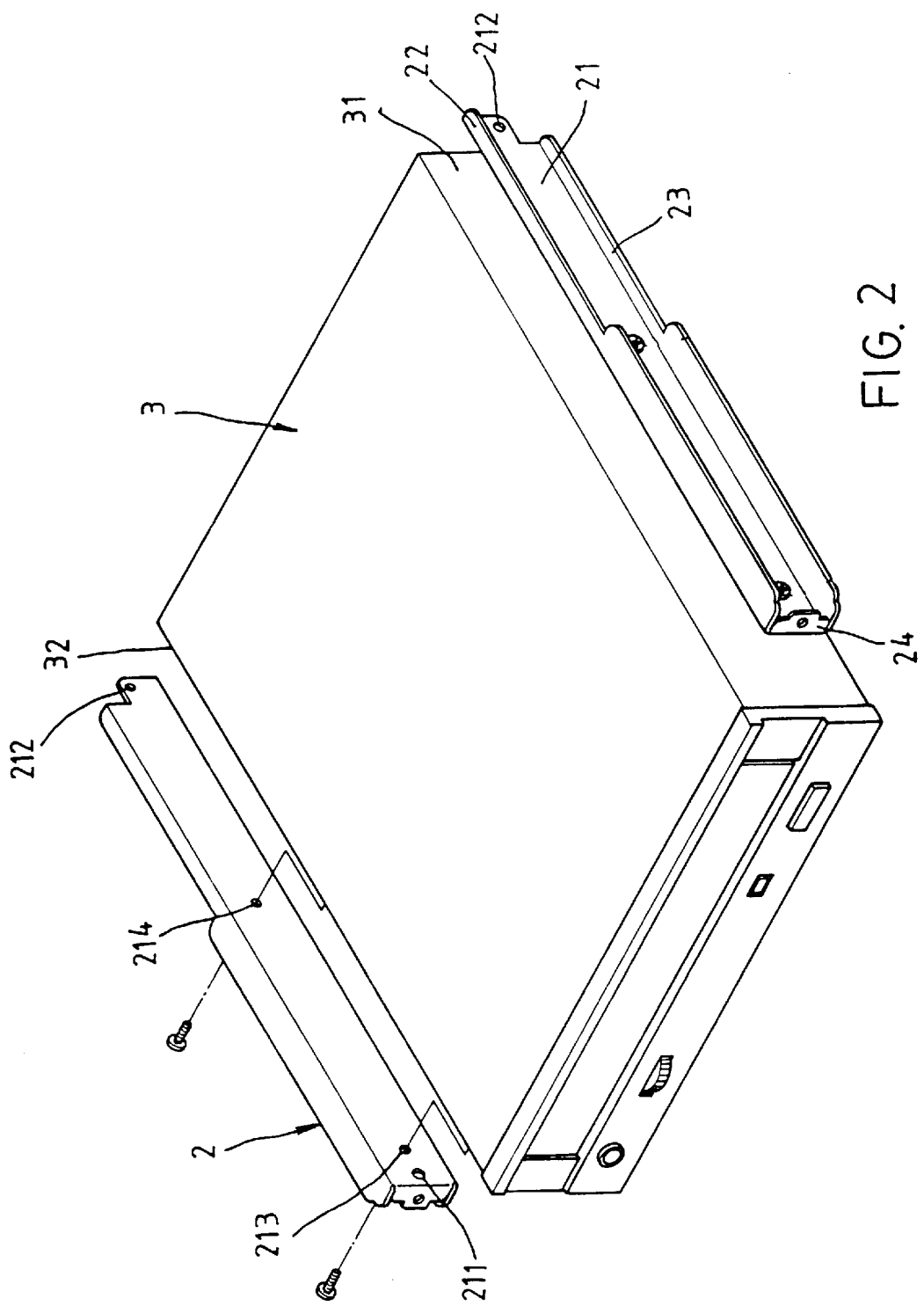
FIG. 2 is a schematic view showing the assembly work of the shielding piece of the present invention and an information-accessing device.
Figure 3:
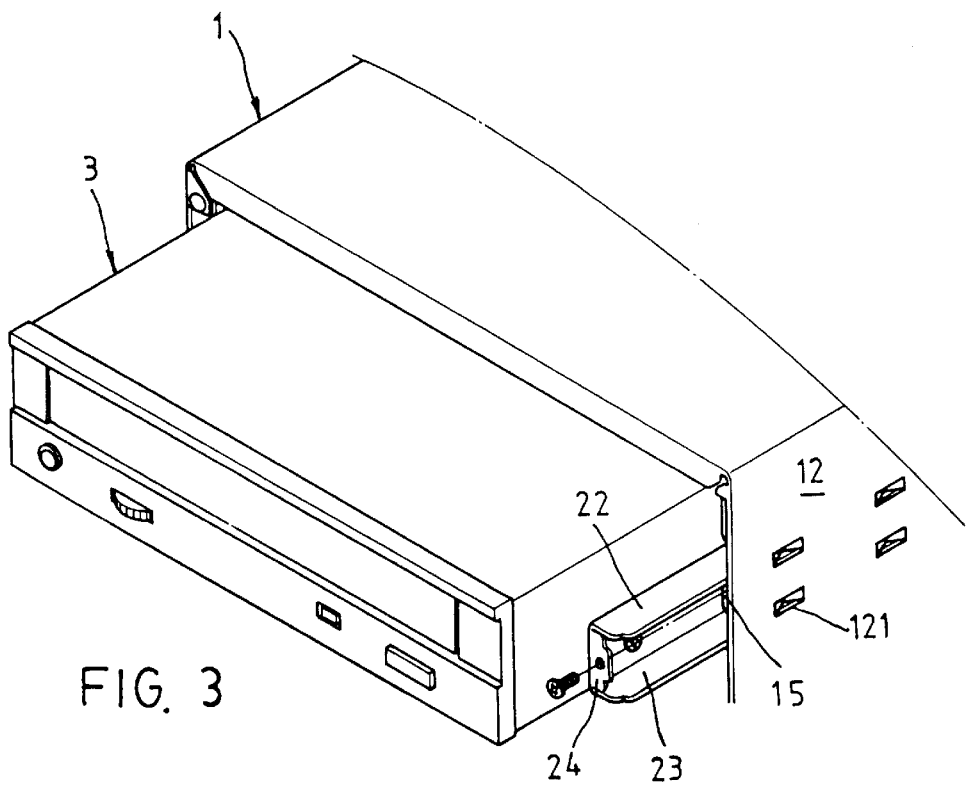
FIG. 3 is a schematic view showing the step of assembling an information-accessing device with shielding pieces being assembled to a computer casing according to the present invention.

Furthermore, a plurality of shielding pieces serves to shield the expansion slots 11 are arranged in front of the slots. Each shielding piece is formed as a sliding groove, as shown in FIG. 2. Each two shielding pieces 2 is formed as a set for locking two outer sides 31, 32 of an information-accessing device. Thereby, the shielding pieces may slide in the tracks on the walls of the computer casing 1, as shown in FIG. 3.

Figure 5:
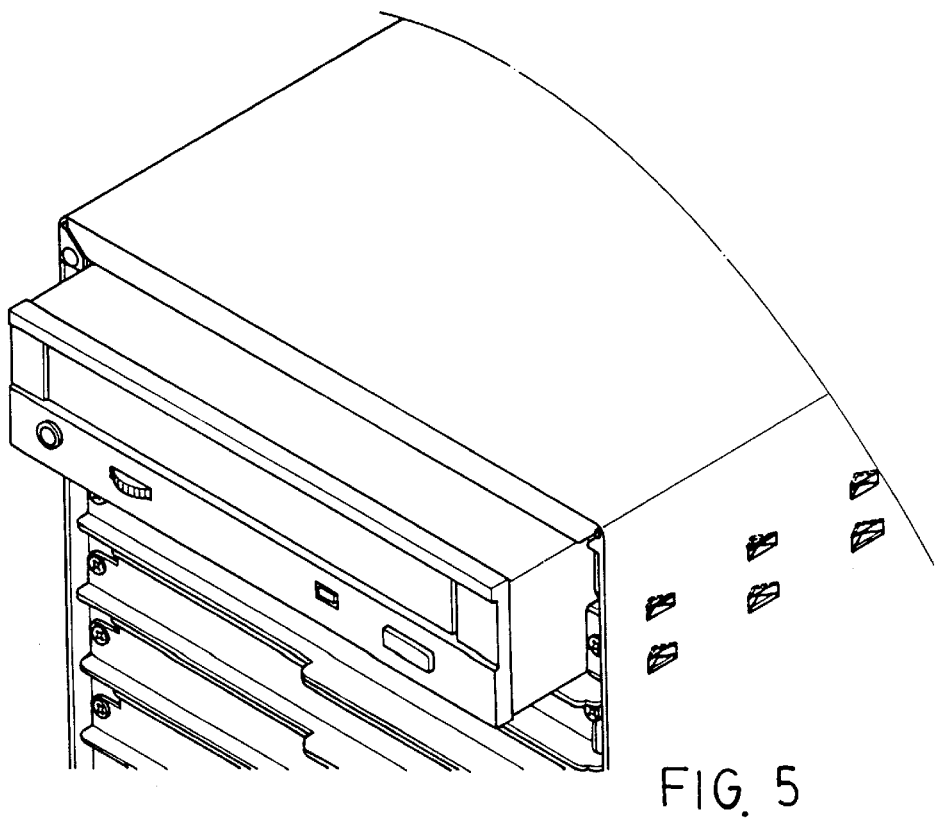
FIG. 5 is a schematic view showing that an information-accessing device with shielding pieces are assembled to a computer casing according to the present invention.
Figure 4:
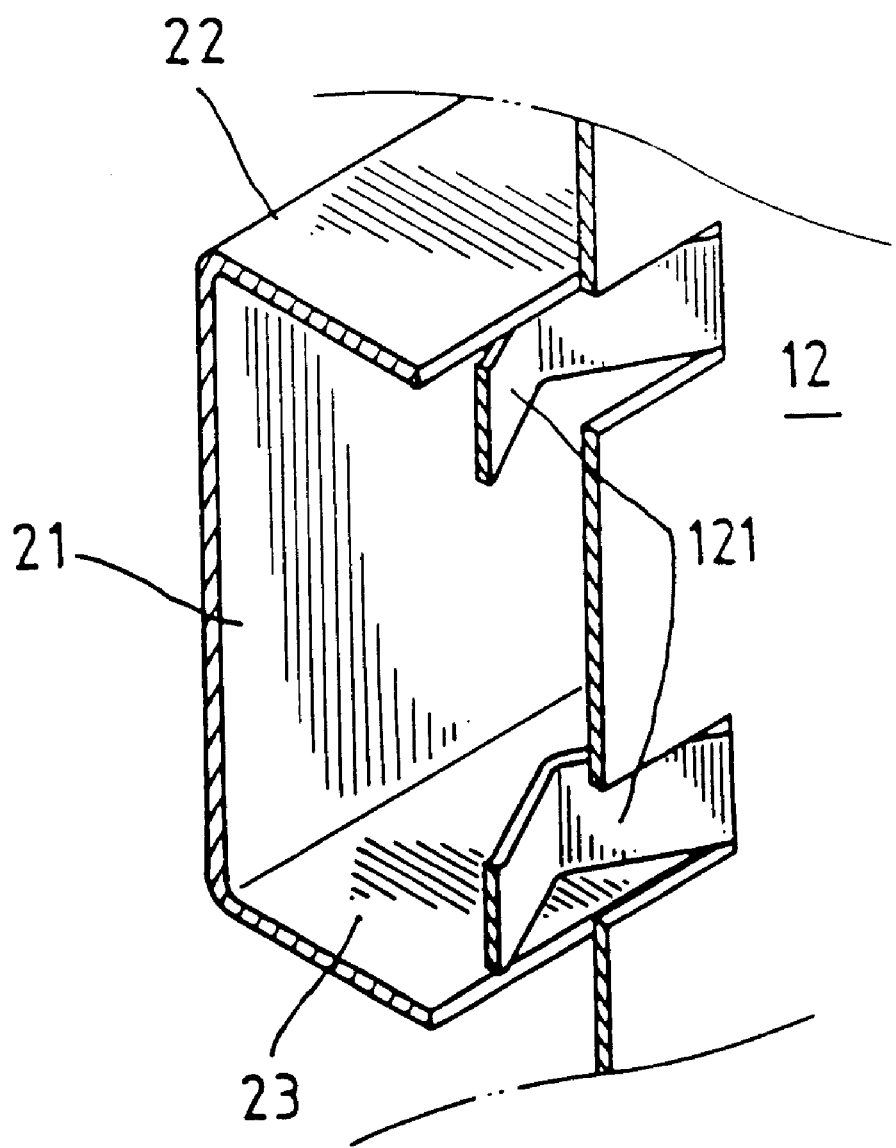
FIG. 4 is a schematic view showing that the shielding pieces assembled to an information-accessing device slide in a computer casing according to the present invention.

It is apparently that the shielding pieces 2 has a plate-shape main body 21 and two wings 22, 23 at two sides of the main body 21 and each having one edge connected to one side of the main body 21 (referring to FIG. 4). Two ends of the main body 21 are formed with positioning holes 211, 212 for combining connecting pieces 14, 15 at two sides of the opening of the computer casing 2. Similarly, two drilling holes 213, 214 are formed on main body 21 for mounting the information-accessing device. Besides, in another embodiment, any end of the main body 21 is folded to form a locking piece 24 which is folded toward a direction identical to that of the wings 22, 23. Referring to FIG. 5, when the information-accessing device slides to a predetermined position in the computer casing 1, the locking piece 24 serves to connect and lock the connecting pieces 14, 15 of the computer casing 1.

Therefore, in the present invention, the shielding pieces may be reused for positioning information-accessing devices to the sliding groove so that the information-accessing devices are slidable along the tracks in the computer casing. Furthermore, no frame for mounting information-accessing devices is necessary to be installed in the computer casing. Besides, the user may assemble the structure by himself (or herself), and the economic burden of the manufacturer is reduced.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer casing with reusable shielding pieces, the computer casing having a plurality of expansion slots; each expansion slot having an opening for mounting an information-accessing device and each of two opposite sides of the opening being formed with a connecting piece; each connecting piece having a hole thereon; each expansion slot having a shielding piece for covering the opening of the expansion slot; characterized in that

- each expansion slot having two lateral walls at two opposite sides; a plurality of tracks are formed on the lateral wall; a size of each shielding piece is corresponding to the tracks so that the shielding piece is slidable along the tracks; each shielding piece is formed with an engaging structure for being engaged to one side of the information-accessing device;
- thereby, two opposite sides of the information-accessing device are engaged with the shielding pieces so that the information-accessing device is slidable along the tracks in the computer casing.

2. The computer casing with reusable shielding pieces as claimed in claim 1, wherein the tracks are formed by a plurality of projections which are arranged linearly.

3. The computer casing with reusable shielding pieces as claimed in claim 2, wherein the shielding piece is formed by a main body and two wings folded from two opposite sides of the main body and toward the same direction; thereby, each shielding piece is slidable along the projections.

4. The computer casing with reusable shielding pieces as claimed in claim 2, wherein the projection has a triangular shape.

5. The computer casing with reusable shielding pieces as claimed in claim 2, wherein the projection has a round shape.

6. The computer casing with reusable shielding pieces as claimed in claim 3, wherein the two ends of the main body are installed with positioning holes, respectively, for being connected to the hole of the connecting pieces.

7. The computer casing with reusable shielding pieces as claimed in claim 3, wherein each end of the main body is folded toward a direction identical to that of the wings so as to form a locking piece; thereby, when the information-accessing device slides to a predetermined position in the computer casing, the locking piece serves to connect and lock the connecting pieces of the computer casing.

* * * * *